United States Patent [19]

Juso et al.

[11] 4,310,838
[45] Jan. 12, 1982

[54] INSTRUCTION CONTROLLED AUDIO VISUAL SYSTEM

[75] Inventors: Hiromi Juso, Gose; Shigeki Tsuji, Tenri; Shigemi Maeda, Sakai, all of Japan

[73] Assignee: Sharp Kabushiki Kaisha, Osaka, Japan

[21] Appl. No.: 81,435

[22] Filed: Oct. 3, 1979

[30] Foreign Application Priority Data

Oct. 4, 1978 [JP] Japan .............................. 53-123844
Oct. 5, 1978 [JP] Japan .............................. 53-123202
Oct. 5, 1978 [JP] Japan .............................. 53-123203
Dec. 29, 1978 [JP] Japan .............................. 53-163355

[51] Int. Cl.³ ............................................ G06F 9/30
[52] U.S. Cl. .................................... 340/701; 340/703; 340/730; 340/734; 340/750; 340/790; 340/798; 340/735; 340/799
[58] Field of Search ............. 35/8 A, 9 A; 273/85 G, 273/DIG. 28; 340/701, 724, 798, 703, 730, 734, 735, 750, 790, 799; 360/33, 79; 358/127, 4

[56] References Cited

U.S. PATENT DOCUMENTS 3,699,565 10/1972 Nagai ................................. 340/798
3,921,161 11/1975 Baer ................................. 360/79 X
4,040,088 8/1977 Hannan ............................. 358/127
4,094,079 6/1978 Dorsett ................................. 35/8 A
4,190,967 3/1980 Ruegg et al. ...................... 35/8 A X
4,194,198 3/1980 Baer et al. ........................... 340/724
4,213,189 7/1980 Mueller et al. .................. 340/798 X Primary Examiner—Raulfe B. Zache
Attorney, Agent, or Firm—Birch, Stewart, Kolasch & Birch

[57] ABSTRACT

An audio visual system comprising a reproduction system for reproducing audio sound information and picture data information recorded on a recording medium, a speaker system for audio sound output purposes, and a color TV screen for providing a visual display in accordance with the picture data information. The picture data information comprises a pattern data and instruction commands for selecting a desired display section on the color TV screen and a desired operation mode to be conducted by the audio visual system. The operation mode can be selected from the entire screen unicolor selection mode, background color change mode, pattern color change mode, display shift mode, small letter display mode, and capital letter display mode.

46 Claims, 22 Drawing Figures (PICTURE SIGNAL PROCESSOR UNIT -110-)

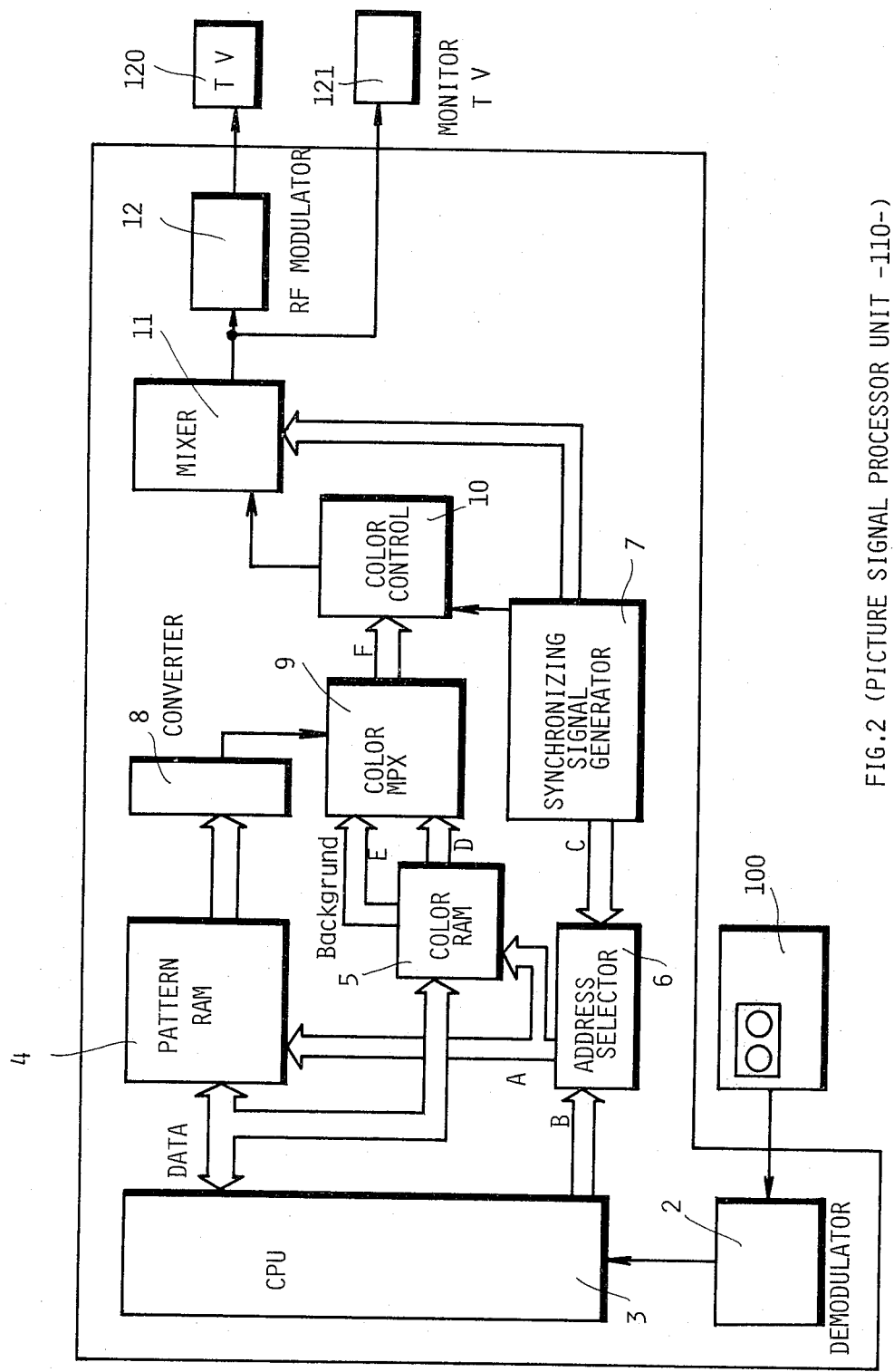
FIG.2 (PICTURE SIGNAL PROCESSOR UNIT -110-)

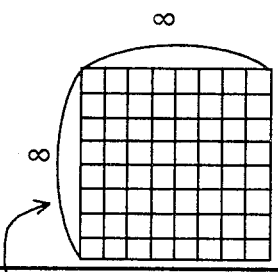
FIG.3 (PICTURE POINT ASSIGN FOR PATTERN RAM -4-)

|   | 1 | 2 | 3 | 4 | 5 | 6 | ----- | 16 |
|---|---|---|---|---|---|---|---|---|
| 1 | 00 | 01 | 02 | 03 | 04 | 05 |   | 0F |
| 2 | 10 | 11 | 12 | 13 | 14 | 15 |   | 1F |
| 3 | 20 | 21 | 22 | 23 | 24 | 25 |   | 2F |
|   |   |   |   |   |   |   |   |   |
| 12 | B0 | B1 | B2 | B3 | B4 | B5 |   | BF |

FIG.4 (PICTURE POINT ASSIGN FOR COLOR RAM -5-)

| | 1 | 2 | 3 | 4 | 5 | 6 | - - - - - - | 16 |
|---|---|---|---|---|---|---|---|---|
| 1 | 00 | 01 | 02 | 03 | 04 | 05 | | 0F |
| 2 | 10 | 11 | 12 | 13 | 14 | 15 | | 1F |
| 3 | 20 | 21 | 22 | 23 | 24 | 25 | | 2F |
| ⋮ | | | | | | | | |
| 12 | B0 | B1 | B2 | B3 | B4 | B5 | | BF |

FIG.5 (LETTER FORMAT)

(UNICOLOR SELECTION FOR THE ENTIRE SCREEN)

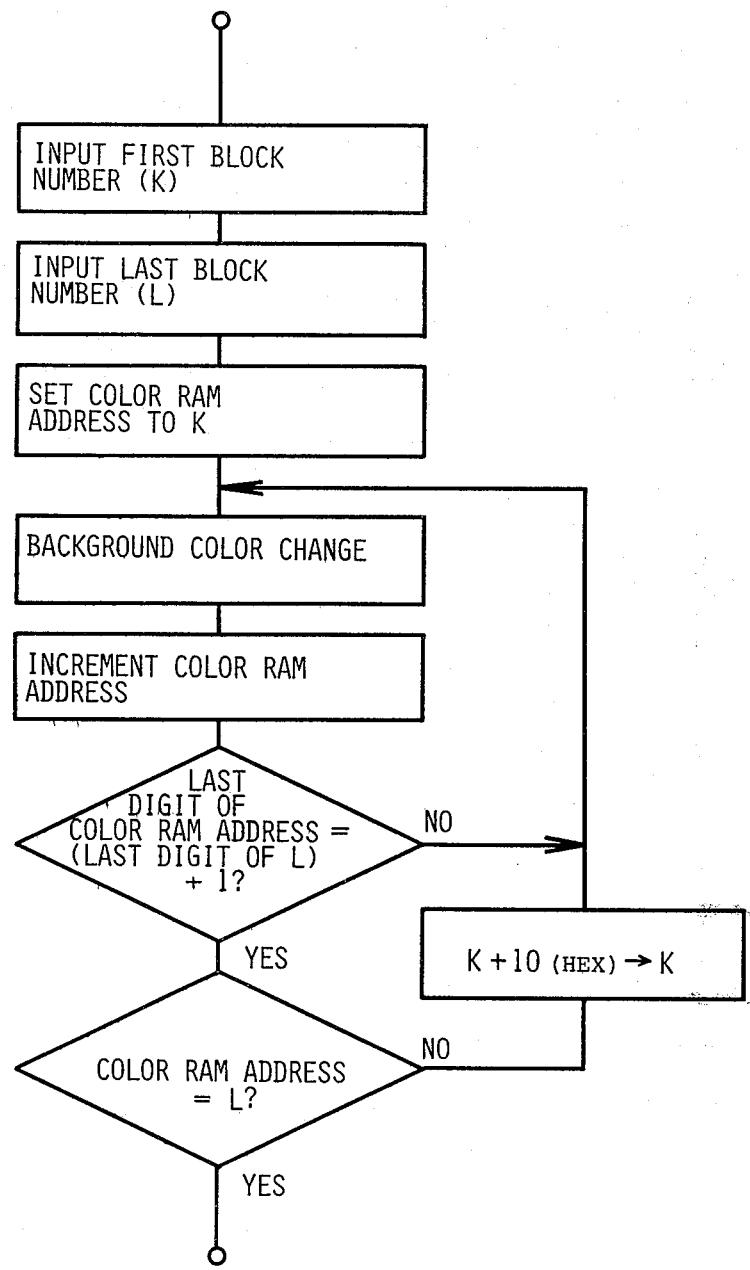
FIG. 6(C) (BACKGROUND COLOR CHANGE)

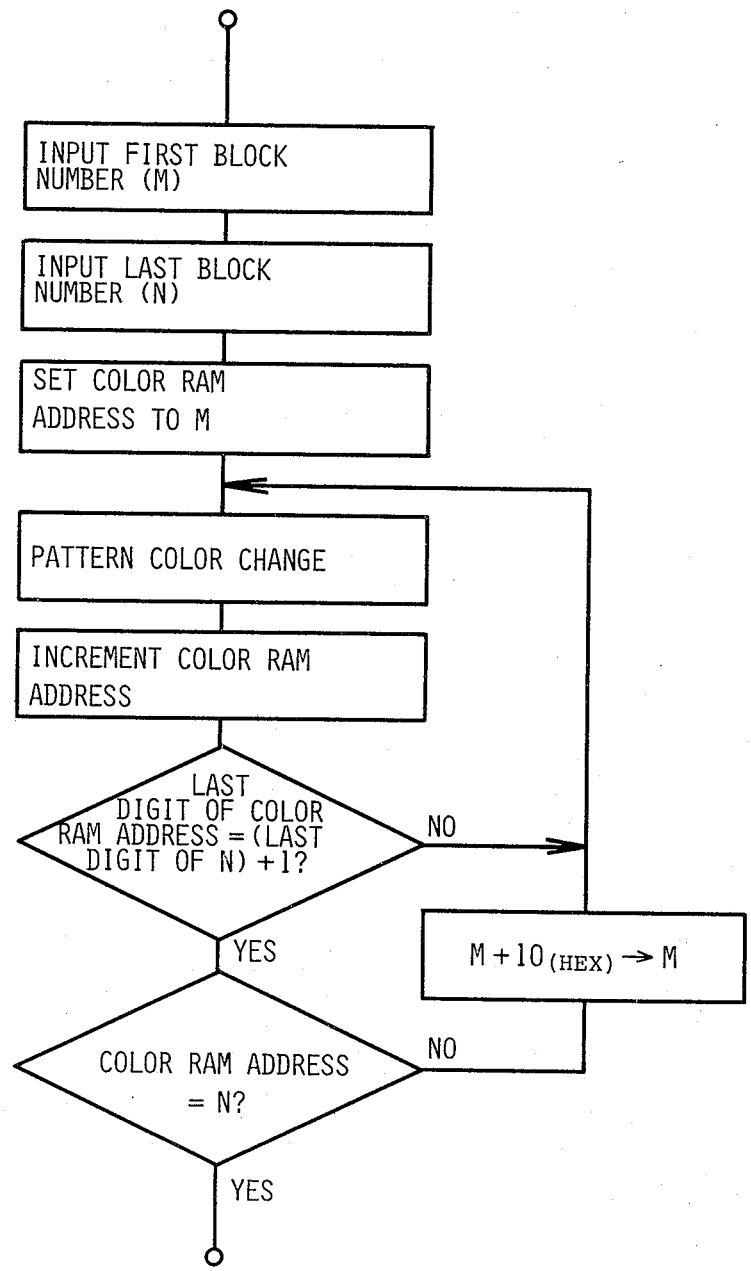
FIG. 6(D) (PATTERN COLOR CHANGE)

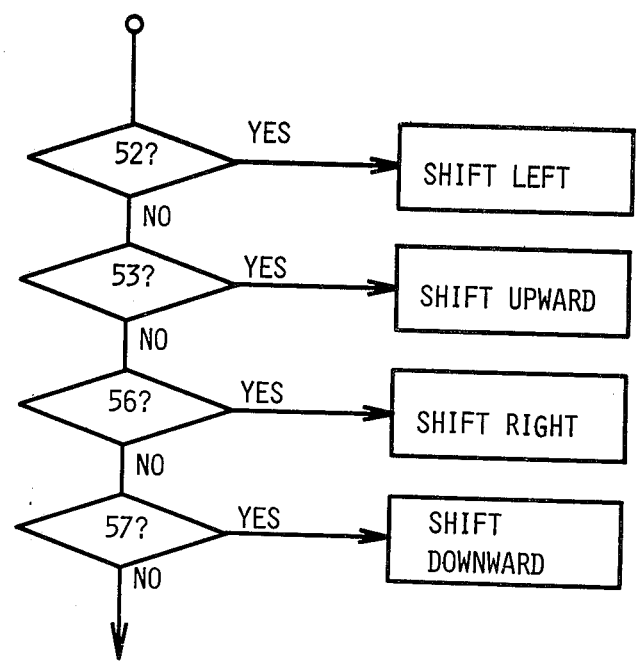
FIG. 6(E) (SHIFT)

(SHIFT RIGHT Part I)

(SHIFT RIGHT Part II)

(SMALL LETTER)

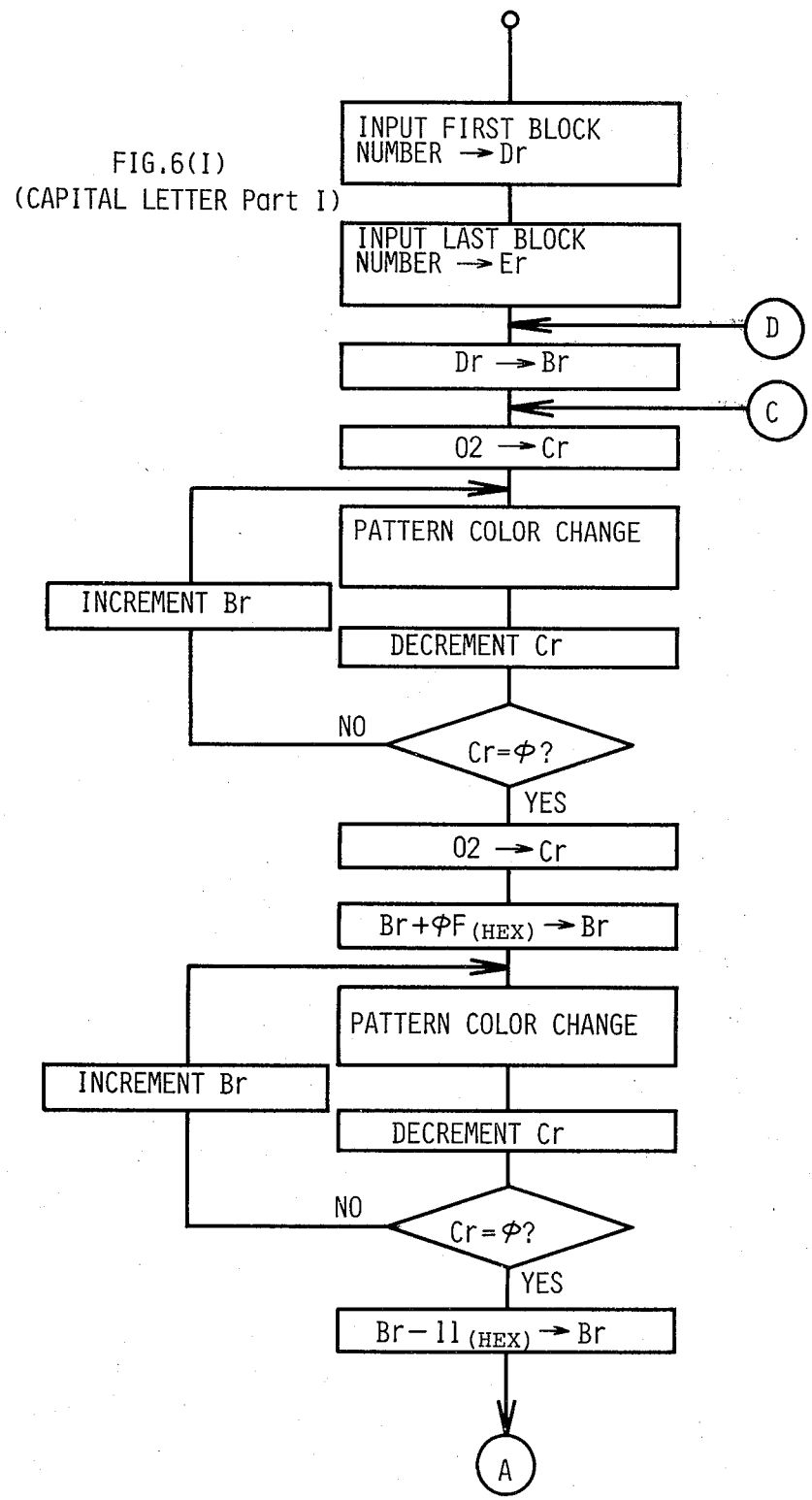
FIG.6(I) (CAPITAL LETTER Part I)

(CAPITAL LETTER Part II)

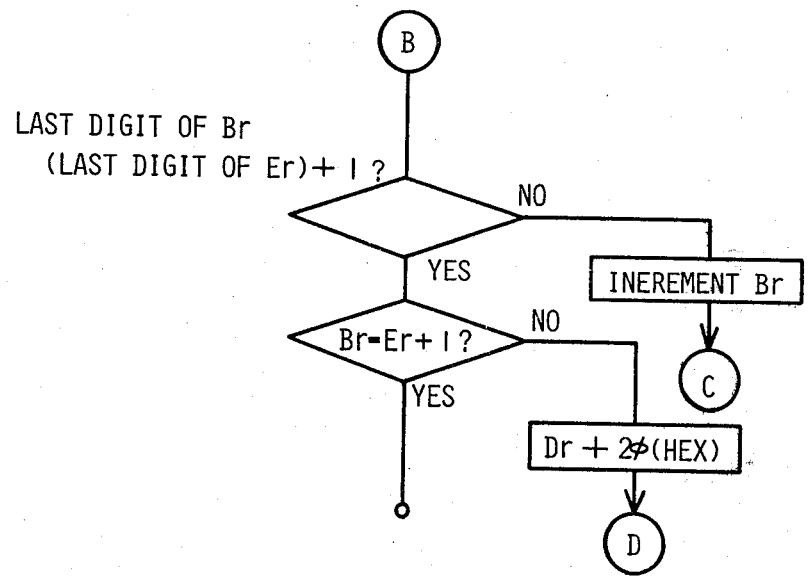
FIG. 6(K) (CAPITAL LETTER Part III)

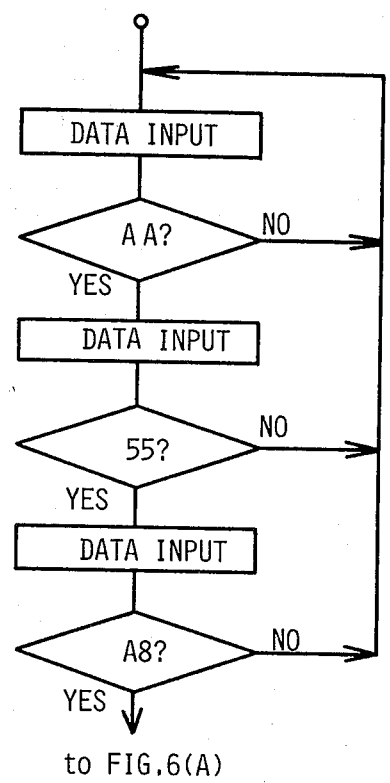
FIG.7 (START SIGNAL DETECTION)

FIG.9 (COLOR CODE VARIATION -20-)

INSTRUCTION CONTROLLED AUDIO VISUAL SYSTEM

BACKGROUND AND SUMMARY OF THE INVENTION

The present invention relates to an audio visual system, wherein a video signal applicable to a home use television set is developed through the use of data signals derived from an audio signal recorder such as the audio cassette tape, audio open-reel tape and audio record player.

A microcomputer controlled display system is developed, wherein a cassette tape recorder is employed as an auxiliary memory means, and a video interface is provided to display a resultant data on a TV screen in accordance with the operation result conducted by the microcomputer in response to the data stored in the cassette tape recorder. In such a conventional microcomputer controlled display system, the display information is fixed and, therefore, variable operations are not conducted.

Accordingly, an object of the present invention is to provide an audio visual system, wherein both of the audio information and the pattern displayed on a color TV screen are responsive to output signals derived from an audio information recording medium.

Another object of the present invention is to provide a video control system, wherein an instruction command related to the display condition is recorded on a video information source.

Still another object of the present invention is to provide an audio visual system employing an audio stereo cassette tape as a memory means for providing a stereo sound output and pattern display on a home-use color TV screen.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, audio sound information and pattern display information are recorded on an audio stereo cassette tape. An instruction command related to the display condition and a position data related to the position on a TV screen are disposed in front of the pattern data recorded on the audio stereo cassette tape. The audio visual system of the present invention mainly comprises a central processor unit and a random access memory for generating a video signal in accordance with the data recorded on the audio stereo cassette tape.

In a preferred form, a start code signal is disposed in front of the instruction command to ensure an accurate operation. In addition, a detection system is provided for correlating the display color on the TV screen with the audio sound output in such a manner that the base color for the pattern display is changed when the audio sound output exceeds a preselected value.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 is a block diagram of an embodiment of a picture signal processor unit included in the audio visual system of FIG. 1;

FIG. 3 is a chart for explaining the picture point assignment of a pattern RAM included in the picture signal processor unit of FIG. 2;

FIG. 4 is a chart for explaining the picture point assignment of a color RAM included in the picture signal processor unit of FIG. 2;

FIG. 5 is a chart for explaining a character format displayed by the audio visual system of FIG. 1;

FIGS. 6(A) through 6(K) are flow charts for explaining operation modes of the picture signal processor unit of FIG. 2;

FIG. 7 is a flow chart for explaining an operation of another embodiment of the audio visual system of the present invention;

DESCRIPTION OF THE PREFERRED EMBODIMENTS

Figure 1:
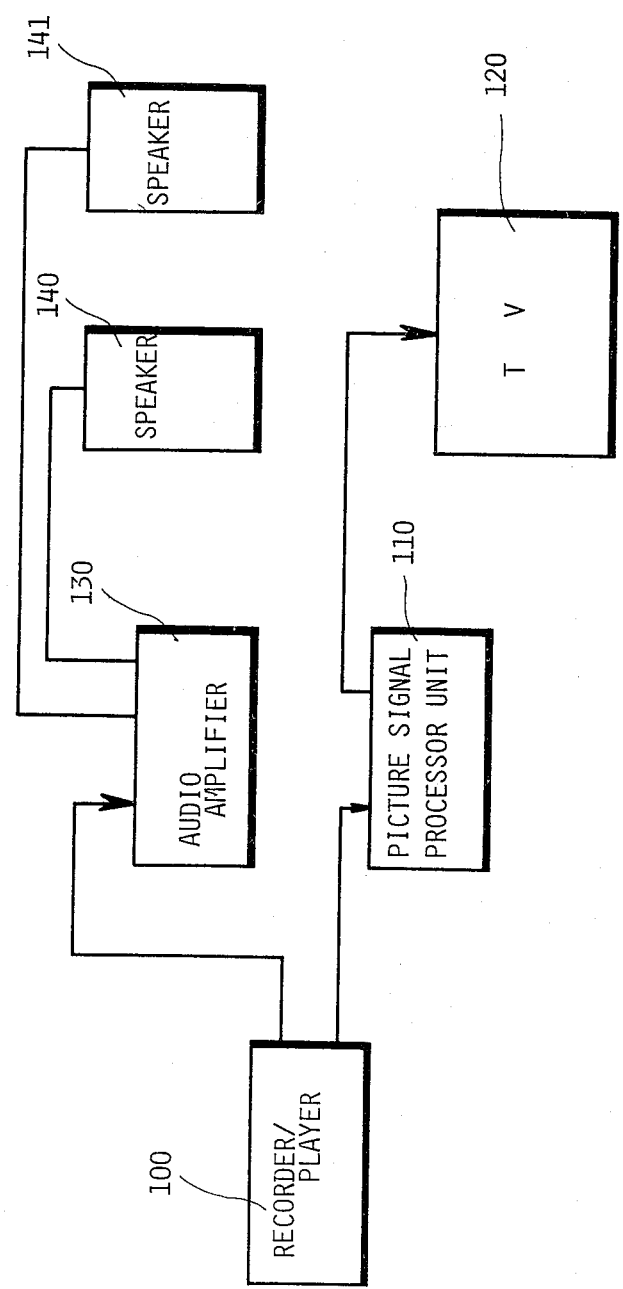
FIG. 1 is a schematic block diagram of an embodiment of an audio visual system of the present invention.

FIG. 1 schematically shows an embodiment of an audio visual system of the present invention.

The audio visual system of the present invention mainly comprises an audio player system 100, a picture signal processor unit 110, and an audio amplifier 130. The audio player system 100 can be an audio stereo cassette tape recorder/player, an audio open-reel tape recorder/player, or an audio disc player. Reproduction signals derived from the audio player system 100 are applied to the picture signal processor unit 110 and the audio amplifier 130. More specifically, the reproduction signals include picture information signals and audio sound signals, the former being applied to the picture signal processor unit 110 and the latter to the audio amplifier 130.

The picture signal processor unit 110 develops video signals in accordance with picture information signals derived from the audio player system 100 for displaying a desired pattern on an image screen of a color TV set 120. The audio amplifier 130 is a conventional one and functions to activate speaker systems 140 and 141 in response to the audio sound signals derived from the audio player system 100.

In a preferred form, the picture information signals are recorded on, for example, the left channel of the recording medium loaded on the audio player system 100, and the audio sound signals are recorded on the right channel of the recording medium.

FIG. 2 shows an embodiment of the picture signal processor unit 110.

The picture information signals include an instruction command signal and a pattern data signal. The picture information signals reproduced by the audio player system 100 is applied to a demodulator 2, which develops demodulated digital signals in response to the picture information signals applied thereto.

The picture signal processor unit 110 mainly comprises a central processor unit 3, a pattern RAM 4 for storing a digital data related to pattern information, and a color RAM 5 for storing a digital data related to color information. The demodulated digital signals derived from the demodulator 2 are applied to the CPU 3, which functions to write-in the digital data into a desired section of the pattern RAM 4 and the color RAM 5 through the use of an address selector 6. More specifically, the address selector 6 selects a desired memory section in the RAM's 4 and 5 via address buses A and B while the digital data is applied from the CPU 3 to the RAM's 4 and 5 via a data bus.

When the address selection operation is not conducted in accordance with the address signal derived from the CPU 3, the address selector 6 receives the address selection signal derived from a synchronizing signal generator 7 via an address bus C. At this moment, the pattern RAM 4 and the color RAM 5 develop the pattern data and the color data, respectively, in response to the synchronizing signal developed from the synchronizing signal generator 7.

The pattern RAM 4 is a random access memory into which the pattern data is written in a selected address (memory block), and from which the pattern data is read out for display purposes.

More specifically, the TV screen is divided into 192 blocks (16×12 blocks) as shown in FIG. 3. Each block comprises 8×8 picture points. And, each picture point corresponds to one bit in the pattern RAM 4. In a preferred form, a row of eight picture points in each block is assigned a specific address, and a pattern data of eight bits is stored in each address of the pattern RAM 4.

The color RAM 5 is a random access memory into which the color data is written in a selected address (memory block), and from which the color data is read out for display purposes.

More specifically, the TV screen is divided into 192 blocks (16×12 blocks) as shown in FIG. 4, and each block is assigned a specific address. Each address corresponds to one memory block comprising eight bits. Each set of the eight bits in the color RAM 5 stores a background color data for determining the color of the background, and a pattern color data for determining the color of the pattern displayed on the TV screen.

In a preferred form, the color data is represented by a three bit signal. In this case, the first bit in each memory block is a blank bit, the second through fourth bits represent the background color data, the fifth bit is a blank bit, and the sixth through eighth bits represent the pattern color data as shown below.

```
  | 0 | 0 | 1 |   | 0 | 0 | 0 |
```

The color data is coded as shown in the following CHART I.

| CHART I (Color Code) | | | |
|---|---|---|---|
| COLOR | | CODE | |
| black | 0 | 0 | 0 |
| blue | 0 | 0 | 1 |
| green | 0 | 1 | 0 |
| cyan | 0 | 1 | 1 |
| red | 1 | 0 | 0 |
| magenta | 1 | 0 | 1 |
| yellow | 1 | 1 | 0 |
| white | 1 | 1 | 1 |

Of course, a four bit code signal can be employed to increase the color information.

The synchronizing signal generator 7 develops the horizontal synchronizing signal, the vertical synchronizing signal, and the address selection signal for selecting addresses in the pattern RAM 4 and the color RAM 5.

The picture signal processor unit 110 further comprises a parallel-to-serial converter 8, a color multiplexer 9, a color control circuit 10, and a mixer 11. The eight bit pattern data read out from the selected address in the pattern RAM 4 is converted into a serial signal by the parallel-to-serial converter 8 in response to the synchronizing signals derived from the sychronizing signal generator 7. The thus obtained serial data signal is applied to the color multiplexer 9, which functions to connect a data bus E for the background color information to a data bus F when the data signal applied from the converter 8 is "0", and connect a data bus D for the pattern color information to the data bus F when the data signal from the converter 8 is "1".

At this moment, the color RAM 5 develops the pattern color data of the selected address through the data bus D, and the background color data of the selected address through the data bus E. Accordingly, the data bus F transfers the pattern color data when the data signal from the converter 8 bears the logic value "1", and the background color data when the data signal from the converter 8 bears the logic value "0". The color control circuit 10 develops a color control signal in accordance with the color data applied through the data bus F. The signal conversion is based on the color code listed in the CHART I. The thus developed color control signal is applied to the mixer 11, which also receives the horizontal synchronizing signal and the vertical synchronizing signal derived from the synchronizing signal generator 7, thereby providing a video signal. The thus obtained video signal is applied to an RF modulator 12, which develops a TV signal to be applied to the home use TV set 120 through an antenna terminal. The video signal derived from the mixer 11 can be applied directly to a monitor TV 121.

The present audio visual system is responsive to an instruction command derived from the audio player system 100. An example of the instruction commands is listed in the following CHART II.

CHART II (Instruction Command Code)

| INSTRUCTION | CODE | | DATA |
| --- | --- | --- | --- |
| (i) UNICOLOR SELECTION FOR THE ENTIRE SCREEN | black | 20 | |
| | blue | 21 | |
| | green | 22 | |
| | cyan | 23 | |
| | red | 24 | |
| | magenta | 25 | |
| | yellow | 26 | |
| | white | 27 | |
| (ii) BACKGROUND COLOR CHANGE | black | 30 | (FIRST BLOCK NUMBER) (LAST BLOCK NUMBER) |
| | blue | 31 | |
| | green | 32 | |
| | cyan | 33 | |
| | red | 34 | |
| | magenta | 35 | |
| | yellow | 36 | |
| | white | 37 | |
| (iii) PATTERN COLOR CHANGE | black | 40 | (FIRST BLOCK NUMBER) (LAST BLOCK NUMBER) |
| | blue | 41 | |
| | green | 42 | |
| | cyan | 43 | |
| | red | 44 | |
| | magenta | 45 | |
| | yellow | 46 | |
| | white | 47 | |
| (iv) SHIFT | left | 52 | (FIRST BLOCK NUMBER) (LAST BLOCK NUMBER) |
| | right | 56 | |
| | up | 53 | |
| | down | 57 | |
| (v) SMALL LETTER | black | 60 | (FIRST BLOCK NUMBER) (LAST BLOCK NUMBER) (PATTERN DATA) |
| | blue | 61 | |
| | green | 62 | |
| | cyan | 63 | |
| | red | 64 | |
| | magenta | 65 | |
| | yellow | 66 | |
| | white | 67 | |
| (Vi) CAPITAL LETTER | black | 70 | (FIRST BLOCK NUMBER) (LAST BLOCK NUMBER) (PATTERN DATA) |
| | blue | 71 | |
| | green | 72 | |
| | cyan | 73 | |
| | red | 74 | |
| | magenta | 75 | |
| | yellow | 76 | |
| | white | 77 | |

The information signal is recorded on the recording medium loaded on the audio player system 100 in the order as shown in the CHART II.

For example, when the entire TV screen is desired to be colored blue, a code signal "21" is recorded on the recording medium. When only the background color is desired to be changed, a code signal in the group (ii), for example, "37" is used, and the first block number data and the last block number data subject to the color change follow the code signal "37". In this case, the background color of the TV screen from the selected first block number to the selected last block number is changed to white. When only the pattern color is desired to be changed, a code signal in the group (iii), for example, "42" is used, and the first block number data and the last block number data subject to the color change follow the code signal "42". In this case, the pattern color on the TV screen in the region from the selected first block number to the selected last block number is changed to green. When the display is desired to be shifted upward by one block, a code signal "53" is used and the first block number data and the last block number data subject to the shift operation follow the code signal "53".

With respect to the small letter display, wherein one character is displayed in one block by a selected color, a code signal in the group (v), for example, "66" is used. The first block number and the last block number between which the small letter is desired to be displayed are determined, and then the pattern data of the small letter to be displayed is recorded on the recording medium. With respect to the capital letter display, wherein one character is displayed in a region extending over four blocks, a code signal in the group (vi), for example, "73" is used. The first block number data and the last block number data between which the capital letter is desired to be displayed appear after the code signal "73", and then the pattern data of the capital letter to be displayed follows the block number data.

The pattern data for the small letter comprises an eight byte signal. The eight byte signal is provided by a desired number corresponding to the character number to be displayed. The pattern data for the capital letter comprises a thirty-two byte signal. The thirty-two byte signal is stored by a desired number corresponding to the character number to be displayed.

The above-mentioned code signal, block number data, and the pattern data are introduced into the CPU 3, which functions to write-in the information into the selected block in the pattern RAM 4 and the color RAM 5. More specifically, the CPU 3 comprises a determination section for determining the instruction command applied thereto, and a write-in control section for performing the data write-in operation into the selected block of the pattern RAM 4 and the color RAM 5 in accordance with the instruction command.

Detailed operation modes of the CPU 3 will be described with reference to FIGS. 6(A) through 6(K). In this example, data is represented in hexadecimal notation.

Figure 6A:
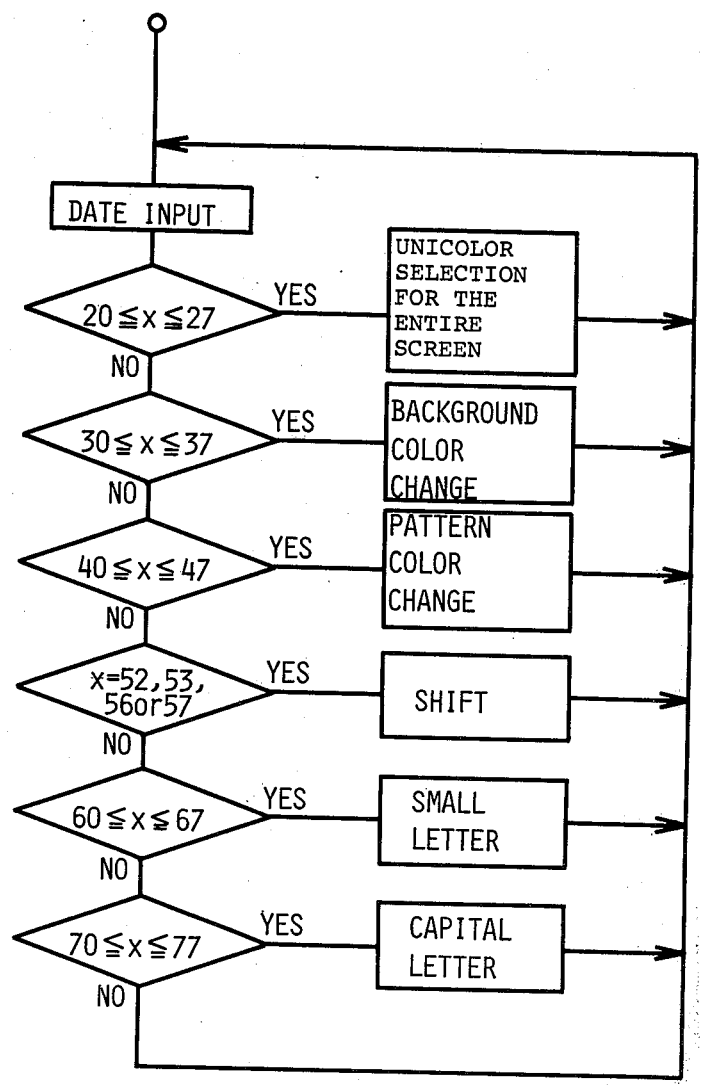

First of all, the CPU 3 functions to determine the code signal listed in the CHART II as shown in FIG. 6(A).

If the code signal between "20" and "27" (inclusive of "20" and "27") is detected, the program is advanced to the "UNICOLOR SELECTION FOR THE ENTIRE SCREEN" mode. When the code signal between "30" and "37" (inclusive of "30" and "37") is detected, the program is advanced to the "BACKGROUND COLOR CHANGE" mode. If the code signal between "40" and "47" (inclusive of "40" and "47") is detected, the program is advanced to the "PATTERN COLOR CHANGE" mode. When the code signal 52, 53, 56 or 57 is detected, the program is advanced to the "SHIFT" mode. In the case where the code signal between "60" and "67" (inclusive of "60" and "67") is detected, the program is advanced to the "SMALL LETTER" mode. If the code signal between "70" and "77" (inclusive of "70" and "77") is detected, the program is advanced to the "CAPITAL LETTER" mode.

[UNICOLOR SELECTION FOR THE ENTIRE SCREEN]

Figure 6B:
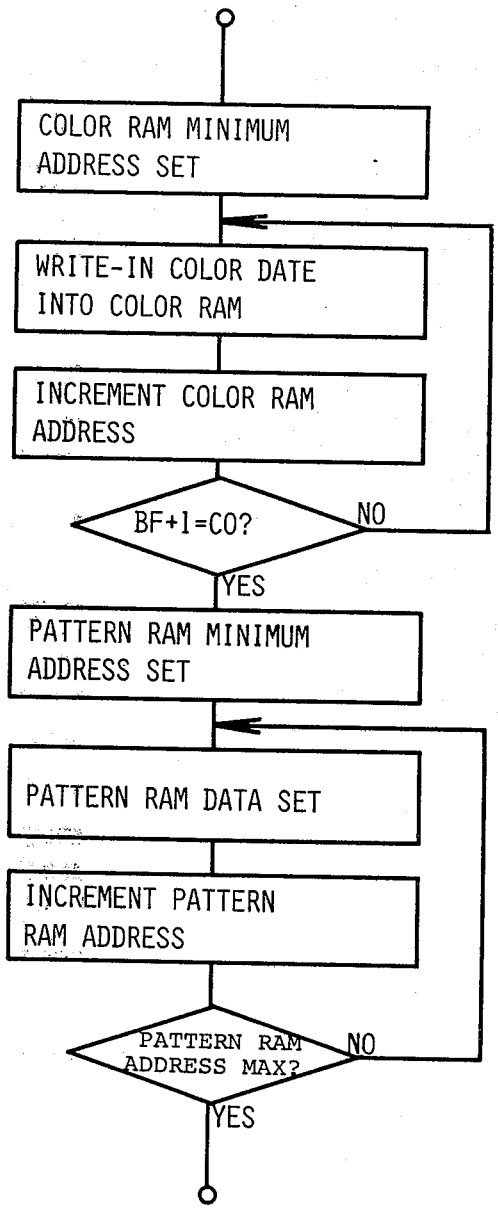

FIG. 6(B) shows the "UNICOLOR SELECTION FOR THE ENTIRE SCREEN" operation. When, for example, a code signal "21" is applied to the CPU 3, the CPU 3 functions to introduce the data "0" into the entire blocks of the pattern RAM 4, and the data identifying "blue" into the background color data section and the pattern color data section of the entire blocks of the color RAM 5.

More specifically, the first address "00" of the color RAM 5 is selected, and the color data "001" corresponding to blue is written therein. The color data "001" is introduced into both of the background color information section and the pattern color information section of the block "00". Then, the next address "01" is selected to introduce the color data "001" into the entire blocks in the color RAM 5. That is, the above operation is repeated till the judge develops a determination output greater than the last number address is selected.

When the introduction of the color data "001" into the entire blocks of the color RAM 5 is completed, the program is advanced to select the first address "000" of the pattern RAM 4. Then, the data "0" is introduced into the first address "000" of the pattern RAM 4. Thereafter, the address selection is advanced to "001". This operation is repeated through a judge program, wherein the determination is conducted whether the address selection is completed to the last address of the pattern RAM 4. When the judge program develops an affirmative answer, that is, when the data "0" is written into the entire sections of the pattern RAM 4, the "UNICOLOR SELECTION FOR THE ENTIRE SCREEN" program is completed.

[BACKGROUND COLOR CHANGE]

FIG. 6(C) shows the "BACKGROUND COLOR CHANGE" operation. When, for example, a data signal "37, 10, 1F" is introduced into the CPU 3, the CPU 3 functions to change the color data for the background in the blocks "10" through "1F" in the color RAM 5 to represent "white", namely, "111".

More specifically, the first block number (K) "10", and the last block number (L) "1F" are introduced into registers included in the CPU 3. Then, the address of the color RAM 5 corresponding to the first block number (K) "10" is selected to introduce the color data "111" into the background information section of the address "10". Thereafter, the color RAM address is incremented by one to introduce the color data "111" into the background color information section of the block "11" of the color RAM 5. This operation is repeated through a judge program, wherein the determination is conducted whether the address selection is performed to the last block number (L) "1F".

The judge program comprises two determination programs. The first determination is whether the address selection will be conducted to the last column of the selected area of the blocks of which the background color is desired to be changed. The second determination is whether the address selection will be conducted to the last block number (L). The program "K+10→K" is provided for advancing the address selection to the next row of the block alignment.

[PATTERN COLOR CHANGE]

FIG. 6(D) shows the "PATTERN COLOR CHANGE" operation. When, for example, a data signal "42, 22, 25" is introduced into the CPU 3, the CPU 3 functions to change the color data stored in the pattern section in the blocks "22" through "25" in the color RAM 5 to represent "green", namely, "010".

More specifically, the first block number data (M) "22", and the last block number data (N) "25" are introduced into the registers included in the CPU 3. Then, the address of the color RAM corresponding to the first block number (M) "22" is selected to introduce the color data "010" into the pattern section of the address "22". The following operation is similar to that explained with reference to FIG. 6(C) except that the color data is introduced into the pattern section in the "PATTERN COLOR CHANGE" operation.

[SHIFT]

When, for example, a data signal "53, 10, 1F" is introduced into the CPU 3, the information displayed on the section "10" through "1F" is shifted upward by one block. In other words, the pattern data stored in the memory blocks "10" through "1F" in the pattern RAM 4 is transferred to and stored in the memory blocks "00" through "0F", and a data "0" is introduced into the memory blocks "10" through "1F" of the pattern RAM 4.

FIG. 6(E) shows the "SHIFT" command determination program. If the code signal "52" is applied to the CPU 3, the operation is advanced to the "SHIFT LEFT" mode. When the code signal "53" is detected, the program is advanced to the "SHIFT UPWARD" operation. In the case where the code signal "56" or "57" is detected, the program is advanced to the "SHIFT RIGHT" operation or the "SHIFT DOWNWARD" operation, respectively.

Figure 6F:
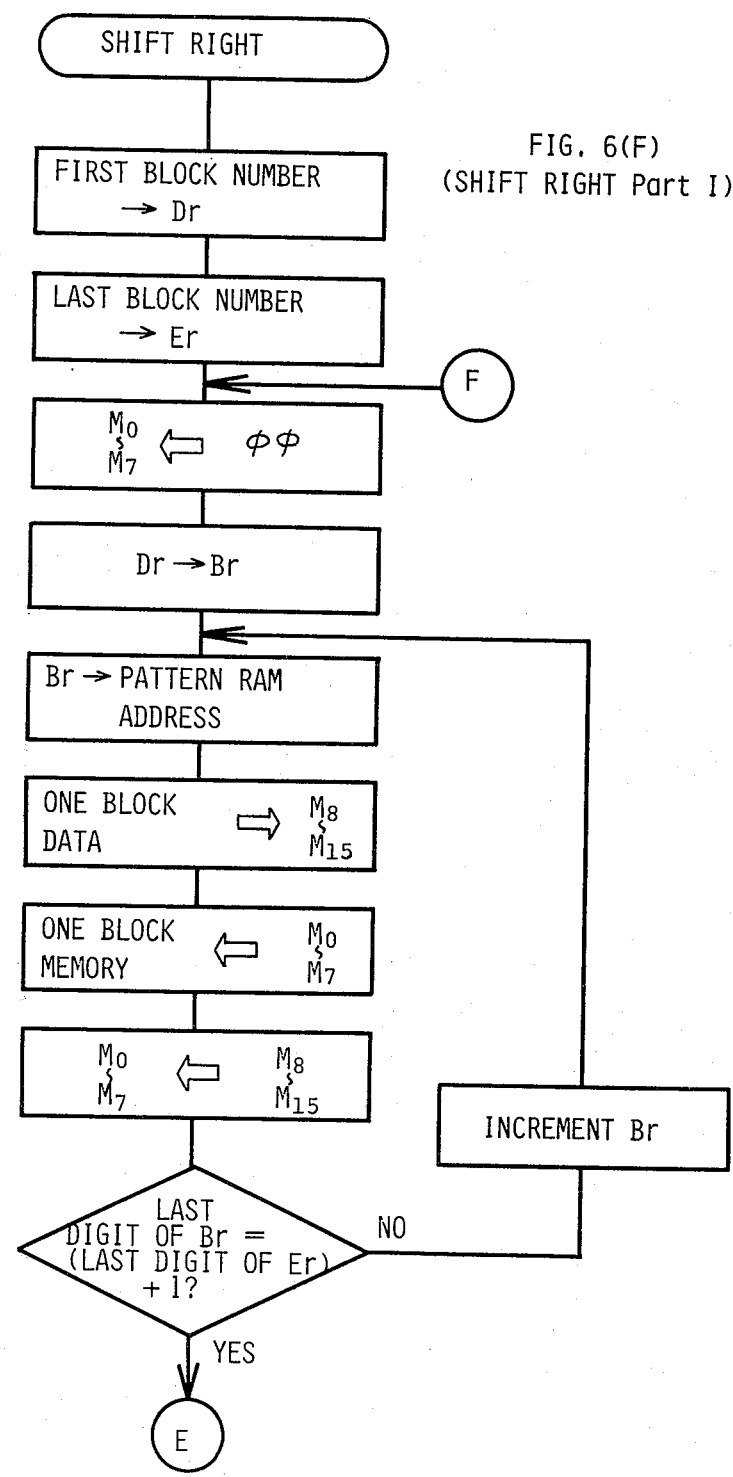
Figure 6G:
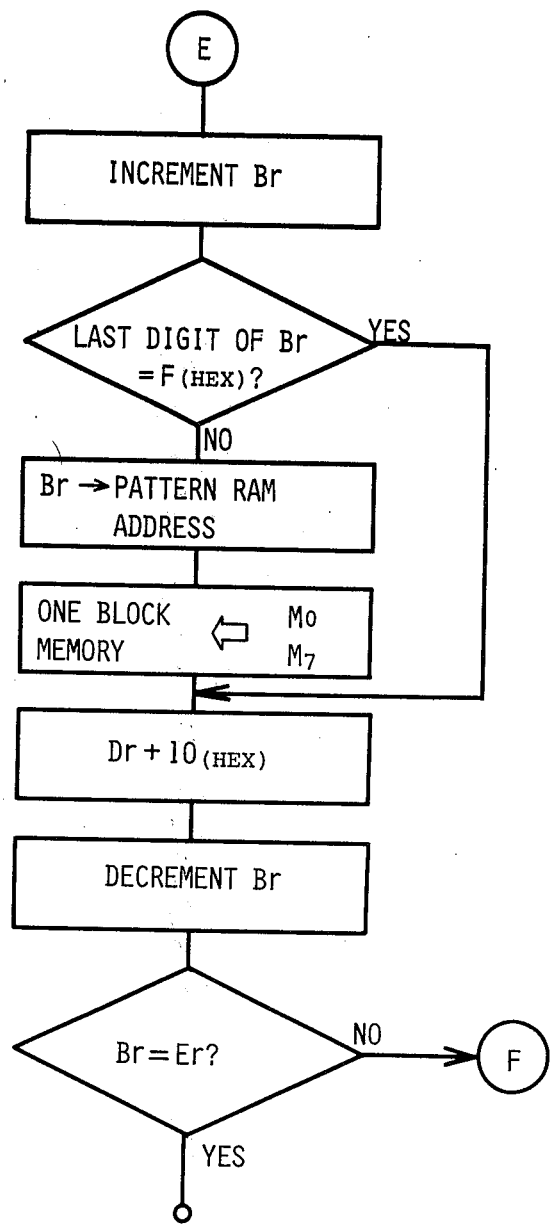

FIGS. 6(F) and 6(G) show the "SHIFT RIGHT" program, which responds to the code signal "56". A first block number data and the last block number data subject to the shift operation are introduced into a D registser Dr, and an E register Er, respectively. At the following step, an erase data "00" is introduced into memory sections $M_0$–$M_7$ (sixteen byte memory, corresponding to one block) included in the CPU 3, and then, the block number data stored in the register Dr is transferred to a register Br. A desired address in the pattern RAM 4 is selected in accordance with the data stored in the register Br.

The one block data stored in the selected block of the pattern RAM 4 and the color RAM 5 is introduced into memory sections $M_8$–$M_{15}$ (sixteen byte memory, corresponding to one block) included in the CPU 3. Thereafter, the erase data "00" is introduced into the selected memory block of the pattern RAM 4 and the color RAM 5. At the following step ($M_8$–$M_{15}$→$M_0$–$M_7$), the data stored in the memory sections $M_8$–$M_{15}$ is transferred to and stored in the memory sections $M_0$–$M_7$. The above-mentioned operation is repeated till the judge "LAST DIGIT OF Br=(LAST DIGIT OF Er)+1" develops an affirmative answer. The data stored in the memory sections $M_0$–$M_7$ is written into the next block of the RAM at the following program "$M_0$–$M_7$→ONE BLOCK MEMORY" in the next cycle of operation. In this way, the data stored in the pattern RAM 4 and the color RAM 5 is shifted rightward by one block.

When the affirmative answer is obtained at the judge step "LAST DIGIT OF Br=(LAST DIGIT Er)+1?", the program is advanced to the flow of FIG. 6(G).

The contents stored in the register Br are incremented by one, and a determination is conducted whether the last digit information stored in the register Br is identical with the number "F (hexadecimal)". If the negative answer is obtained, the information data stored in the memory sections $M_0$–$M_7$ is written into the RAM at the memory block corresponding to the information stored in the register Br.

Then, the contents stored in the register Dr is increased by "10 (hexadecimal)", and the contents stored in the register Br is decremented by one. Thereafter, the judgement "Br=Er?" is conducted to repeat the above programs or to complete the shift operation.

[SMALL LETTER]

When, for example, a data signal "66, 04, 05, (eight byte data for the small letter "a"), (eight byte data for the small letter "b")" is introduced into the CPU 3, the eight byte pattern data for the small letter "a" is introduced into the memory block "04" of the pattern RAM 4, and the eight byte pattern data for the small letter "b" is introduced into the memory block "05" of the pattern RAM 4. Moreover, the color code data "110" for yellow is introduced into the pattern color information section of the memory blocks "04" and "05" of the color RAM 5. FIG. 5 schematically shows the pattern display of the small letters "a" and "b" in the blocks "04" and "05", respectively.

Figure 6H:
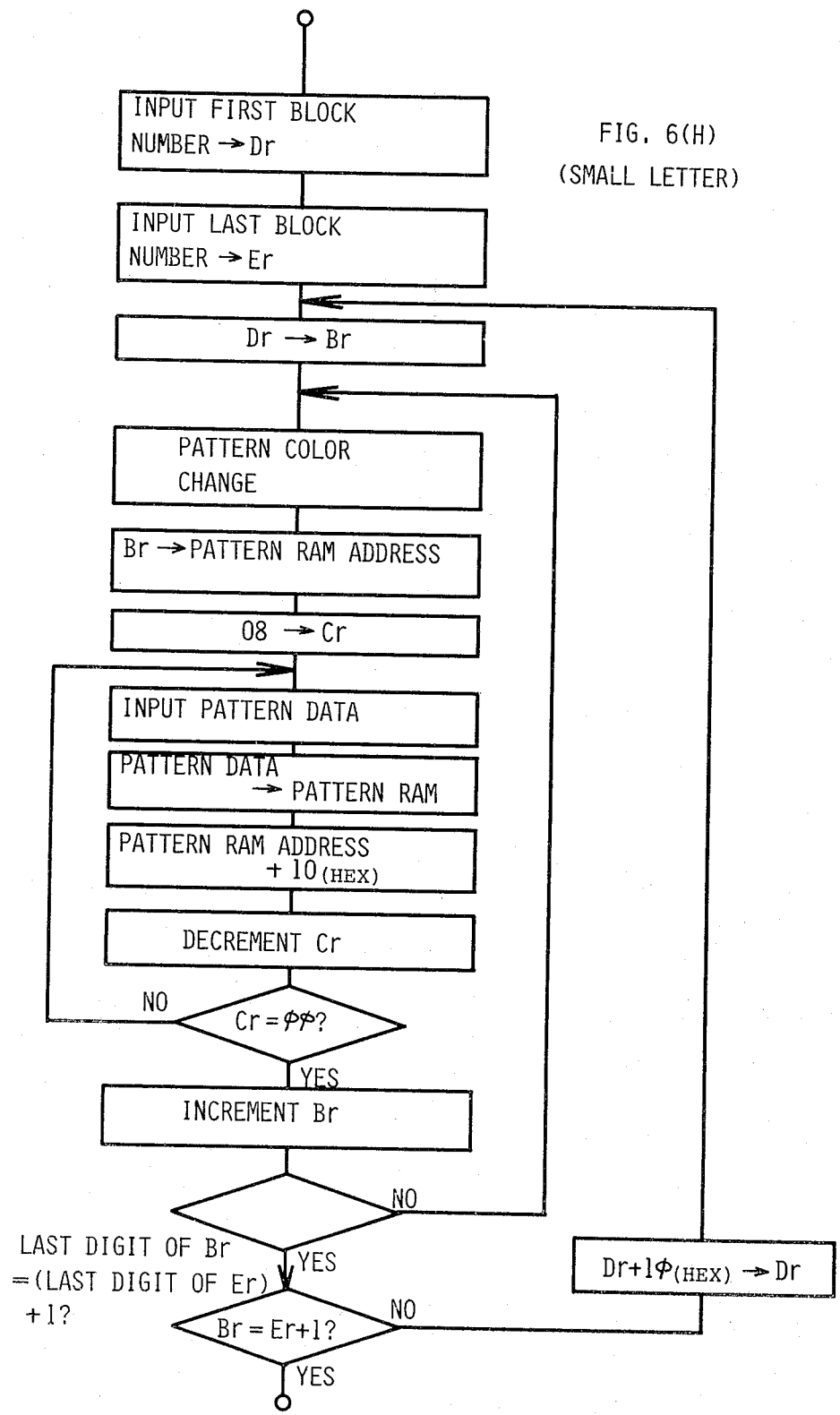

FIG. 6(H) shows "SMALL LETTER" operation flow.

The first block number data "04" is introduced into the register Dr included in the CPU 3, and the last block number data "05" is introduced into the register Er included in the CPU 3. Then, the contents stored in the register Dr is transferred to the register Br. Thereafter, the color code information "110" is introduced into the pattern color information section of the memory block selected by the register Br. A desired address in the pattern RAM 4 corresponding to the data stored in the register Br is selected. A data "08" is introduced into a register Cr. The following program is to introduce the pattern data for the small letter "a" into the memory block "04" of the pattern RAM 4.

Now assume that the eight byte pattern data (hexadecinormal notation) for the small letter "a" is "00, 00, 30, 08, 78, 48, 7C, 00". The eight bit data "00" is introduced in the addresses "04" and "14" of the pattern RAM 4. The eight bit data "30 (hexadecimal)" is introduced into the address "24" of the pattern RAM 4. The eight bit data "08", "78", "48", "7C", and "00" is introduced into the addresses "34", "44", "54", "64" and "74" of the pattern RAM 4, respectively. In the same way, the eight byte pattern data for the small letter "b" is introduced into the addresses "05", "15", "25", "35", "45", "55", "65" and "75" of the pattern RAM 4.

[CAPITAL LETTER]

When, for example, a data signal "73, 11, 13, (thirty-two byte data for the capital letter "A"), (thirty-two byte data for the capital letter "B")" is introduced into the CPU 3, the thirty-two byte data for the capital letter "A" is introduced into the memory blocks "11", "12", "21" and "22" of the pattern RAM 4, and the thirty-two byte data for the capital letter "B" is introduced into the memory blocks "13", "14", "23" and "24" of the pattern RAM 4. FIG. 5 schematically shows the capital letter display of "A" and "B" in the above-mentioned blocks. Moreover, a color code data "011" for defining cyan is introduced into the pattern color information section of the memory blocks "11", "12", "21", "22", "13", "14", "23" and "24" of the color RAM 5.

Figure 6J:
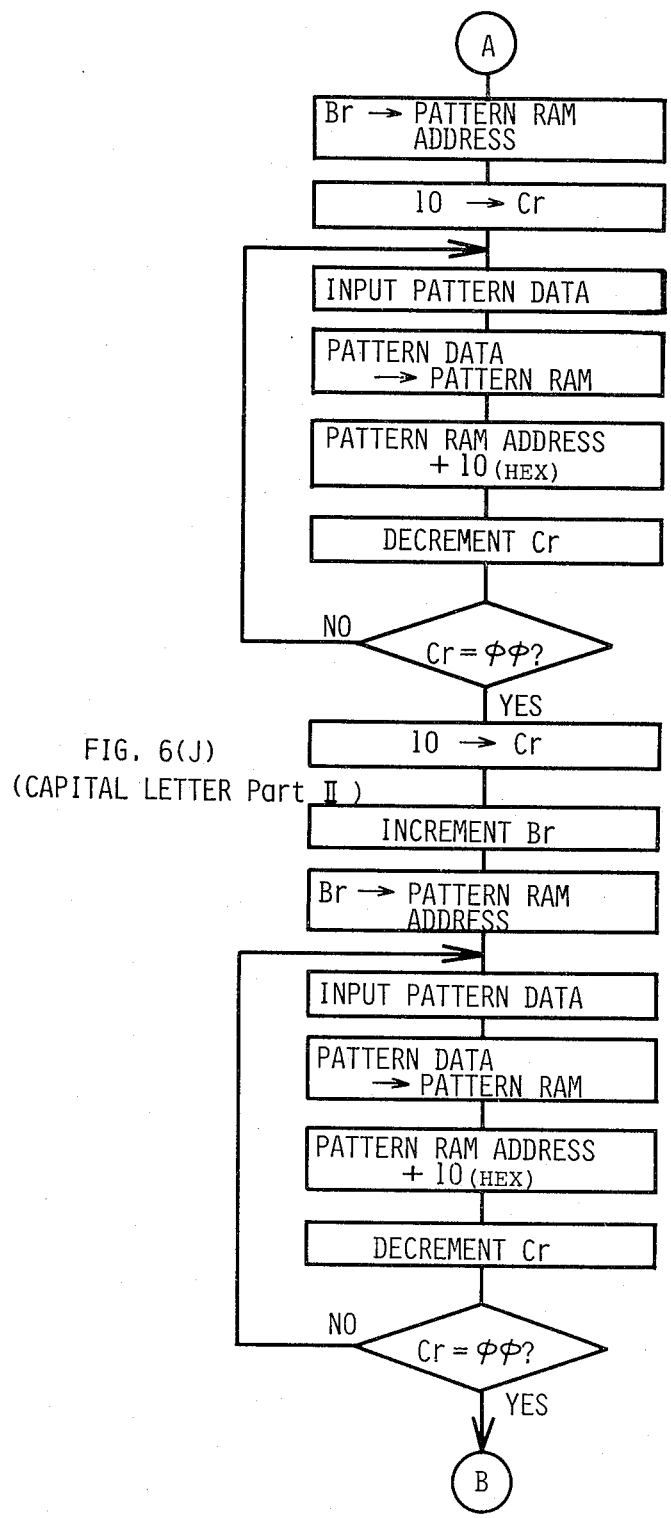

FIGS. 6(I), 6(J) and 6(K) show the detailed operation flow for the "CAPITAL LETTER" mode. The operation is similar to that for the "SMALL LETTER" mode except that, in the "CAPITAL LETTER" mode, the control extents over four memory blocks to display one character.

As already discussed above, a set of data for displaying a small letter "a" in "cyan" in a block "12" is as follows.

63, 12, 12, 00, 00, 30, 08, 78, 48, 7C, 00

To perform an accurate operation, it is strictly required that the above-mentioned data is applied to the CPU 3 from the first data "63". If the above-mentioned set of data is erroneously reproduced from the sixth data "30", the CPU 3 erroneously functions to perform the "background color change" operation to "black". In addition, there is a possibility that a noise signal in a cassette tape recorder/player system will produce an erroneous operation.

To minimize such an erroneous operation, in another embodiment of the present invention, a "start code" data is positioned in front of the above discussed eleven byte data signal. The "start code" data is a specific data such as "AA, 55, A8", which does not appear in the CHART II.

FIG. 7 shows the "start code" detection flow, which is positioned in front of the instruction command determination flow shown in FIG. 6(A). It will be clear from FIG. 7 that the actual operation never takes place unless the "start code" data is detected by the CPU 3 in advance of appearance of the actual data signal.

Figure 8:
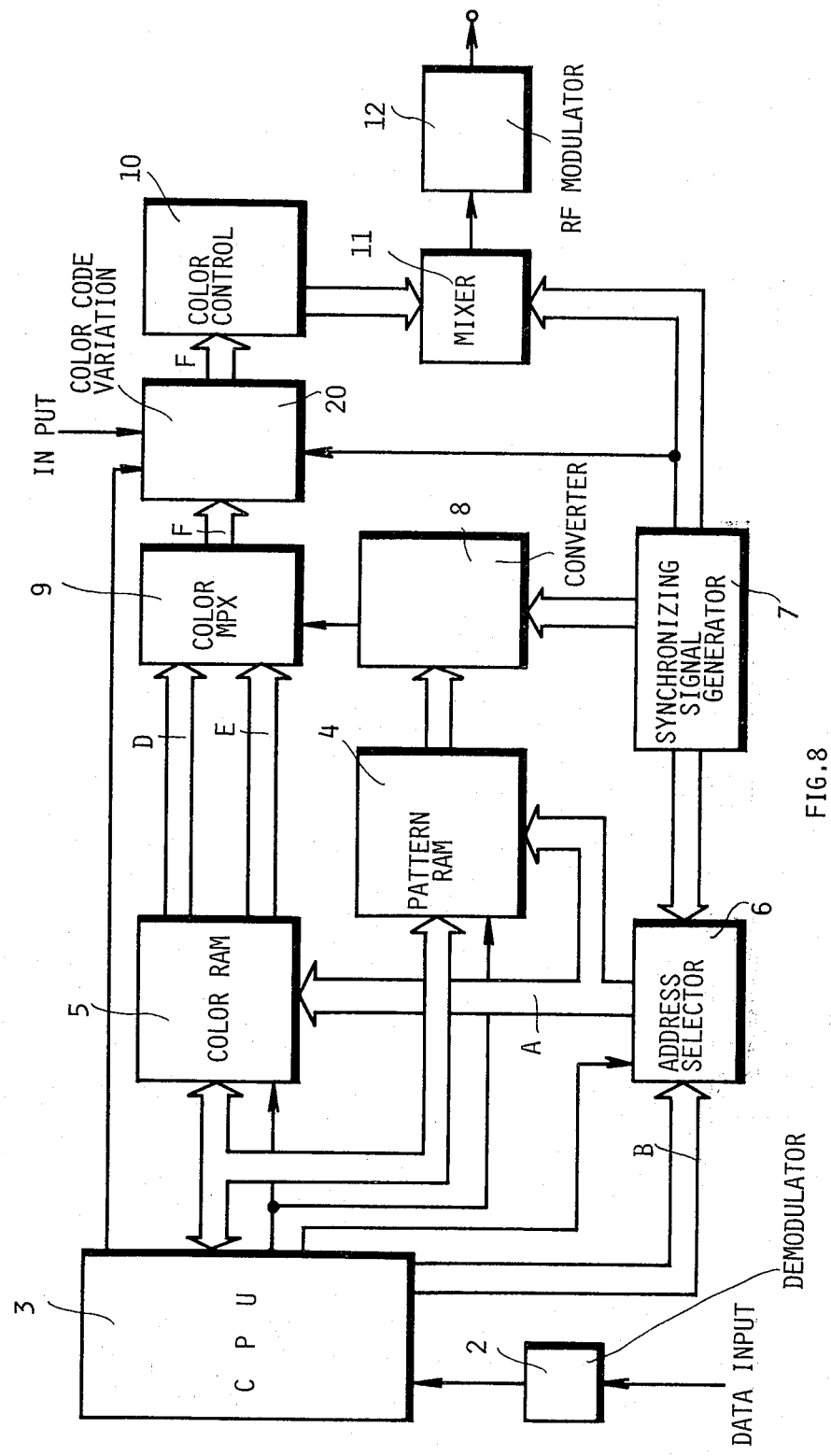
FIG. 8 is a block diagram of another embodiment of a picture signal proceesor unit of the audio visual system of the present invention.

FIG. 8 shows another embodiment of a picture signal processor unit 110, wherein the display color is changed in response to variations of the audio output level. Like elements corresponding to those of FIG. 2 are indicated by like numerals.

A color code variation circuit 20 is interposed between the color multiplexer 9 and the color control circuit 10 for varying the color code signal in response to variations of the audio output applied thereto. More specifically, the color code variation circuit 20 provides a digital signal by A-D converting the audio information sound signal applied thereto. The color code variation circuit 20 includes a read only memory (ROM) for developing a modified color code signal in response to the above-mentioned digital signal and the color data applied from the color multiplexer 9.

Figure 9:
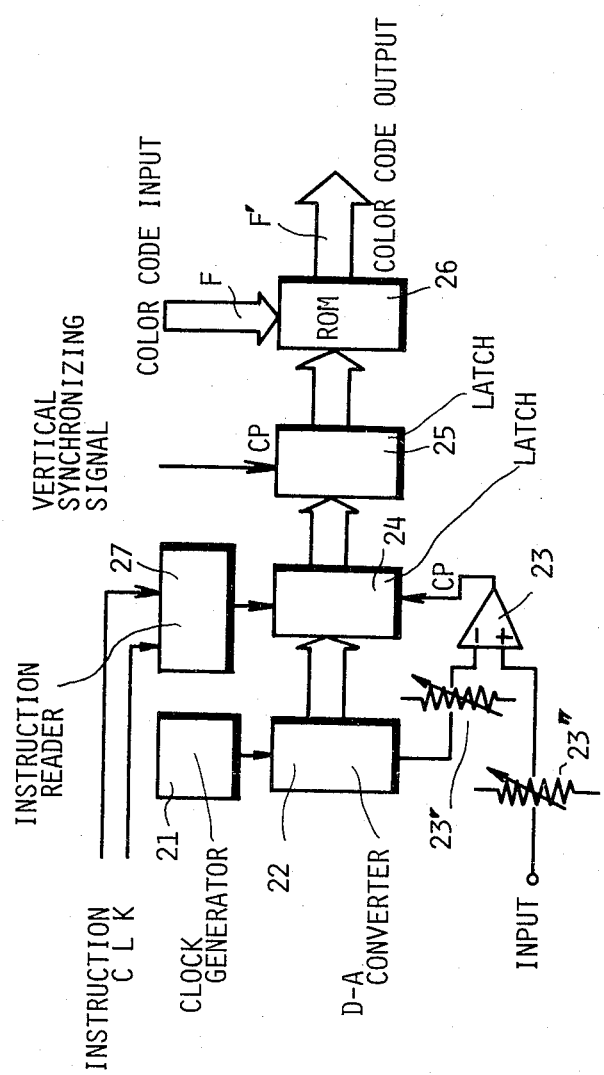
FIG. 9 is a block diagram of a color code varying circuit included in the picture signal processor unit of FIG. 8.

FIG. 9 shows an embodiment of the color code variation circuit 20.

The color code variation circuit 20 mainly comprises a clock generator 21 for developing a clock signal of several hundreds KHz, a digital-to-analog converter 22, D-type latch circuits 24 and 25, and a read only memory (ROM) 26.

The clock signal developed from the clock generator 21 is applied to the digital-to-analog converter 22. The digital-to-analog converter 22 comprises a three bit D-A converter including three bit counter and resistors. The analog signal developed from the digital-to-analog converter 22 is applied to the latch circuit 24, and to a comparator 23 through a variable resistor 23'. The comparator 23 functions to compare the audio sound signal level with the above-mentioned analog signal. When the audio sound signal applied through a variable resistor 23" becomes greater than the analog signal from the digital-to-analog converter 22, the output signal of the comparator 23 changes from the logic value "0" to the logic value "1".

The D-type latch circuit 24 functions to hold a three bit digital data applied from the digital-to-analog converter 22 in accordance with the detection output derived from the comparator 23. More specifically, the D-type latch circuit 24 holds the three bit digital data at a time when the audio sound signal level exceeds the reference level determined by the digital-to-analog converter 22. The D-type latch circuit 25 receives the vertical synchronizing signal developed from the synchronizing signal generator 7 as a clock signal. The D-type latch circuit 25 is also of three bit construction, and functions to hold the data stored in the latch circuit 24 in a fashion synchronized with the vertical synchronizing signal.

The read only memory (ROM) 26 is a bipolar ROM for changing the color code data introduced from the color multiplexer 9 in accordance with the three bit data applied from the D-type latch circuit 25. More specifically, the bipolar ROM 26 includes pages of three bits and addresses of three bits for each page. That is, 64 kinds of color code change can be conducted by the bipolar ROM 26. The three bit data signal from the latch circuit 25 is used for selecting the page, and the color code data introduced from the color multiplexer 9 is used for selecting the addresses in each page. The color code change operation will be more clearly understood from the following CHART III.

| CHART III (Bipolar ROM - 26 -) | | | | | | | | |
|---|---|---|---|---|---|---|---|---|
| Color | | Page | | | | | | |
| Code | 0 | 1 | 2 | 3 | 4 | 5 | 6 | 7 |
| 0 black | 0 | 0 | 0 | 0 | 0 | 0 | 0 | 0 |
| 1 blue | 1 | 2 | 3 | 4 | 5 | 6 | 5 | 6 |
| 2 green | 2 | 3 | 4 | 5 | 6 | 1 | 5 | 6 |
| 3 cyan | 3 | 4 | 5 | 6 | 1 | 2 | 5 | 6 |
| 4 red | 4 | 5 | 6 | 1 | 2 | 3 | 5 | 6 |
| 5 magenta | 5 | 6 | 1 | 2 | 3 | 4 | 5 | 6 |
| 6 yellow | 6 | 1 | 2 | 3 | 4 | 5 | 5 | 6 |
| -continued | | | | | | | | |
| CHART III (Bipolar ROM - 26 -) | | | | | | | | |
| Color | | Page | | | | | | |
| Code | 0 | 1 | 2 | 3 | 4 | 5 | 6 | 7 |
| 7 white | 7 | 7 | 7 | 7 | 7 | 7 | 7 | 7 |

The CHART III shows an example of the color code change. In this example, when the color data introduced from the color multiplexer 9 is "0 (black)" or "7 (white)", no code change is conducted without regard to the three bit data applied from the latch circuit 25. The thus changed color code data is applied to the following color control circuit 10 through a data bus F'.

The color code variation circuit 20 further comprises an instruction reader circuit 27, which develops a control signal of the logic value "1" when an instruction signal from the CPU 3 bears the logic value "1", and develops a control signal of the logic value "0" when the instruction signal from the CPU 3 takes the logic value "0". The control signal derived from the instruction reader circuit 27 is applied to the latch circuit 24 to place the latch circuit 24 into the operative condition only when the control signal from the instruction reader 27 takes the logic value "1". The output data from the latch circuit 24 is forced to "0" when the control signal from the instruction reader 27 bears the logic value "0". In the former condition, the color code data applied from the color multiplexer 9 is changed in accordance with the map shown in the CHART III. In the latter condition, no color code change is performed since page "1" of the CHART III is selected.

The above-mentioned instruction signal can be constructed to respond to a manual depression of a specific operation key. In a preferred form, a color code change instruction data can be recorded on the recording medium which is loaded on the recorder/player 100.

The color change operation can be conducted for both of the pattern color information and the background color information. Or, the color code change operation can be selectively conducted only for the pattern color information or the background color information.

Figure 10:
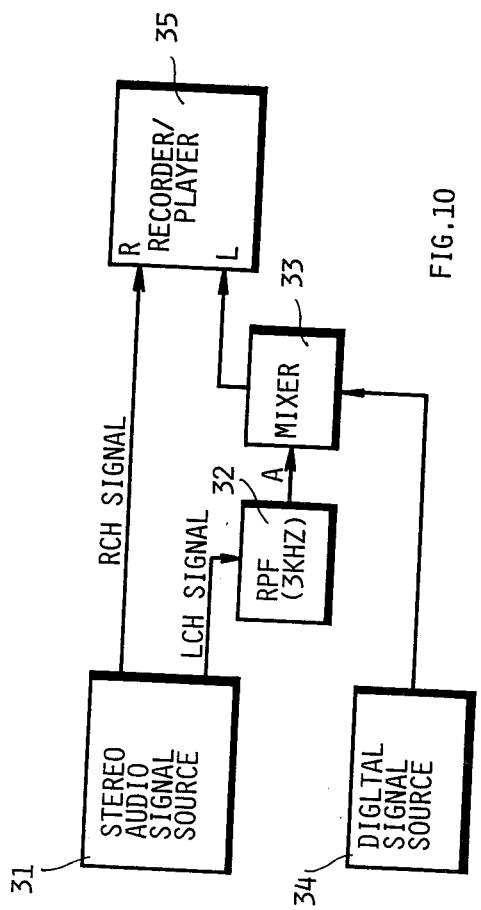
FIG. 10 is a schematic block diagram of a record system suited for still another embodiment of the audio visual system of the present invention.
Figure 11:
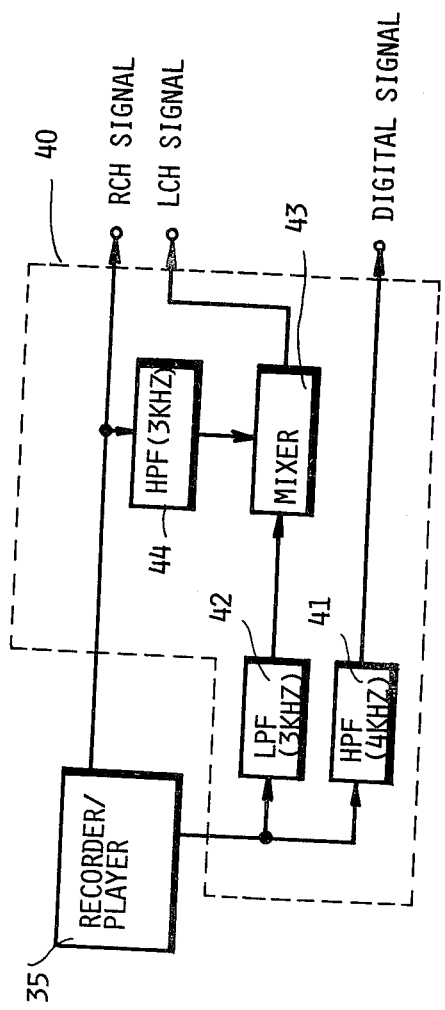
FIG. 11 is a schematic block diagram of a reproduction system suited for the embodiment of FIG. 10.
Figure 12:
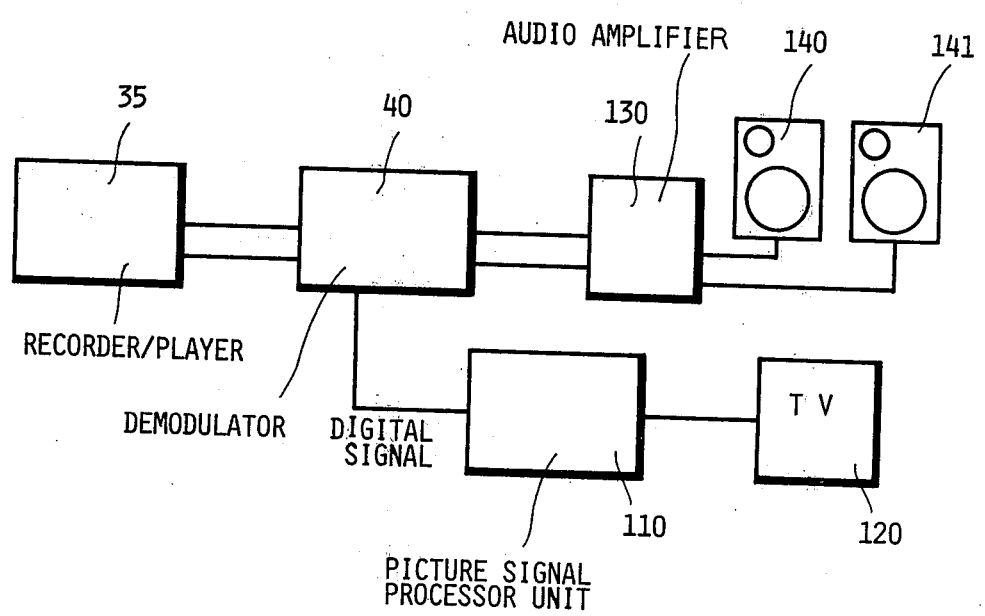
FIG. 12 is a schematic block diagram of still another embodiment of the audio visual system of the present invention employing the reproduction system of FIG. 11.

In the foregoing embodiment, the audio sound information is recorded on the first channel, and the picture information (inclusive of the instruction command and the pattern data) is recorded on the second channel. FIGS. 10, 11 and 12 show an embodiment, wherein a multi-recording technique is employed for providing a stereo sound output. More specifically, the audio sound information is recorded on the first and second channels, and the picture information is recorded on the second channel.

FIG. 10 schematically shows a recording system for the multi-recording technique.

A stereo sound information signal is developed from a stereo audio signal source 31. The right channel signal is applied directly to a cassette tape recorder 35. The left channel signal is applied to a mixer 33 through a low pass filter 32. That is, the audio signal applied to the mixer 33 includes the analog signal of which the frequency is below 3 KHz. A digital signal source 34 develops the above-mentioned instruction commands and the pattern data in a digital signal fashion. The digital data signal is constructed to have the frequency band above 4 KHz. Accordingly, the mixer 33 develops a composite signal including the audio information in the range below 3 KHz and the digital data information in the range above 4 KHz. The thus obtained right channel audio signal and the left channel composite signal are recorded on the cassette tape, respectively, through the use of the cassette tape recorder 35 in a manner as is well known in the art.

FIG. 11 schematically shows an embodiment of a demodulator 40 suited for demodulating the above-mentioned right channel audio signal and left channel composite signal.

The right channel audio signal derived from the cassette tape player 35 is developed through the demodulator 40. The left channel composite signal is applied to a high pass filter 41 and a low pass filter 42. The high pass filter 41 passes a digital signal of the frequency above 4 KHz, which functions as the picture signal (inclusive of the instruction commands and the pattern data). The low pass filter 42 develops the audio signal of the frequency below 3 KHz. The thus obtained audio signal is applied to a mixer 43. The mixer 43 also receives the right channel signal through a high pass filter 44, thereby providing the left channel audio sound signal for the stereo sound output.

FIG. 12 schematically shows the audio visual system employing the demodulator 40 shown in FIG. 11.

The right channel audio signal and the left channel audio signal derived from the demodulator 40 are applied to the amplifier 130 for activating the speaker systems 140 and 141. The digital signal derived from the demodulator 40 is applied to the picture signal processor unit 110 for displaying the desired pattern in a desired color on the image screen of the TV set 120.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A video system for generating a visual display on a television screen, said system comprising:
   a tape player reading picture data information from a tape, said picture data information including pattern data and color data;
   first memory means for storing said pattern data therein;
   second memory means for storing said color data therein;
   means for combining said pattern data stored in said first memory means with color data stored in said second memory means to produce combined picture data;
   means for converting said combined picture data produced by said means for combining into a video signal; and
   television monitor means for converting said video signal into a visual display on said television screen.

2. The system of claim 1 wherein said television screen is divided into a plurality of display areas; and
   wherein said first and second memory means include memory arrays having individual addresses, each address corresponding to a separate area of said television screen.

3. The system of claim 2 wherein said pattern data includes at least one pattern data word, each pattern data word containing information indicative of a visual pattern within one of said areas of said television screen.

4. The system of claim 3 wherein said color data includes at least one color data word, each color data word containing information indicative of the color of the visual pattern and the color of the background of one of said areas of said television screen.

5. The system of claim 4 wherein each pattern data word and each color data word includes check code data positioned at the beginning of each of said words.

6. The system of claims 1 or 4 wherein said pattern data and color data contain information indicative of changes of the displayed pattern and color.

7. The system of claim 6 further comprising:
   initialization means for generating an initial uniform background color on said television screen for providing initialization data to said first and second memory means prior to receipt of said pattern data and color data.

8. The system of claim 1 wherein said tape also includes audio information stored on the same portions of said tape as said picture data information.

9. The system of claim 8 further comprising an audio reproduction system for converting said audio information on said tape into audible sounds.

10. A video system comprising:
    a television screen;
    a tape player reading picture data information from a tape, said picture data information including pattern data and color data, said pattern data and color data being stored at independent locations on said tape and read from said tape at independent times;
    means for converting said pattern data and said color data into a single video signal; and
    television monitor means for converting said video signal into a visual display on said television screen.

11. The system of claim 10 wherein said means for converting includes:
    first memory means for storing said pattern data therein;
    second memory means for storing said color data therein; and
    means for combining said pattern data stored in said first memory with said color data stored in said second memory and for producing a video signal therefrom.

12. The system of claim 11 wherein said television screen is divided into a plurality of display areas; and
    wherein said first and second memory means include memory arrays having individual addresses, each address corresponding to a separate area of said television screen.

13. The system of claim 12 wherein said pattern data includes at least one pattern data word, each pattern data word containing information indicative of a visual pattern within one of said areas of said television screen.

14. The system of claim 13 wherein said color data includes at least one color data word, each color data word containing information indicative of the color of the visual pattern and the color of the background within one of said areas of said television screen.

15. The system of claim 14 wherein each pattern data word and each color data word includes check code data positioned at the beginning of each of said words.

16. The system of claims 11 or 14 wherein said pattern data and color data contain information indicative of changes of the displayed pattern and color.

17. The system of claim 16, further comprising:
    initialization means for generating an initial uniform background color on said television screen by providing initialization data to said first and second memory means prior to receipt of said pattern data and color data.

18. The system of claim 10 wherein said tape also includes audio information stored on the same portions of said tape as said picture data information.

19. The system of claim 18 further comprising an audio reproduction system for converting said audio information on said tape into audible sounds 20. A video system for generating a visual display on a television screen, said system comprising:
 a tape player reading picture data information from a tape, said picture data information being indicative of desired changes of said visual display;
 memory means for storing information corresponding to the visual display to be generated on said television screen;
 means for altering the information stored in said memory means in response to said picture data information indicative of desired changes;
 means for repeatedly and sequentially reading the information stored in said memory means and for converting said information into a video signal; and
 television monitor means including said television screen for converting said video signal into the visual display on said television screen.

21. The system of claim 20 wherein said picture data information includes pattern change data and color change data.

22. The system of claim 21 wherein said memory means includes;
 first storage means for storing picture data therein; and
 second storage means for storing color data therein.

23. The system of claim 22 wherein said means for reading and converting includes;
 means for combining said picture data stored in said first storage means with said color data stored in said second storage means.

24. The system of claim 23 wherein said television screen is divided into a plurality of display areas; and
 wherein said first and second memory means include memory arrays having individual addresses, each address corresponding to a separate area of said television screen.

25. The system of claim 24 wherein said pattern change data includes at least one pattern data word, each pattern data word containing information indicative of a visual pattern within one of said areas of said television screen.

26. The system of claim 25 wherein said color change data includes at least one color data word, each color data word containing information indicative of the color of the visual pattern and the color of the background within one of said areas of said television screen.

27. The system of claim 26 wherein each pattern data word and each color data word includes check code data positioned at the beginning of each of said words.

28. The system of claim 23, further comprising:
 initialization means for generating an initial uniform background color on said television screen by providing initialization data to said first and second memory means prior to receipt of said pattern change data and color change data.

29. The system of claim 23 wherein said tape also includes audio information stored on the same portions of said tape as said picture data information.

30. The system of claim 29 further comprising an audio reproduction system for converting said audio information on said tape into audible sounds.

31. A video system for generating a visual display on a television screen, said system comprising:
 a tape player reading picture data information from a tape, said picture data information including pattern change data and color change data;
 first memory means for storing pattern data therein;
 second memory means for storing color data therein;
 means for combining said picture data stored in said first memory means with said color data stored in said second memory means to produce combined picture data, said combined picture data corresponding to the visual display to be generated on said television screen;
 means for altering the pattern data stored in said first memory means in response to said pattern change data and for altering the color data stored in said second memory means in response to said color change data;
 means for converting said combined picture data into a video signal; and
 television monitor means for converting said video signal into a visual display on said television screen.

32. The system of claim 31 wherein said television screen is divided into a plurality of display areas; and
 wherein said first and second memory means include memory arrays having individual addresses, each address corresponding to a separate area of said television screen.

33. The system of claim 32 wherein said pattern change data includes at least one pattern data word, each pattern data word containing information indicative of a visual pattern within one of said areas of said television screen.

34. The system of claim 33 wherein said color change data includes at least one color data word, each color data word containing information indicative of the color of the visual pattern and the color of the background within one of said areas of said television screen.

35. The system of claim 34 wherein each pattern data word and each color data word includes check code data positioned at the beginning of each of said words.

36. The system of claim 31, further comprising:
 initialization means for generating initial uniform background color on said television screen by providing initialization data to said first and second memory means prior to receipt of said pattern change data and color change data.

37. The system of claim 31 wherein said tape also includes audio information stored on the same portions of said tape as said picture data information.

38. The system of claim 37 further comprising an audio reproduction system for converting said audio information on said tape into audible sounds.

39. A video system for generating a visual display on a television screen, said system comprising:
 a tape player reading picture data information from a tape, said picture data information including pattern change data and color change data;
 first memory means for storing pattern data indicative of visual pattern displayed on the television screen;
 second memory means for storing color data indicative of the colors of the visual pattern displayed on the television screen;

means for altering the pattern data stored in said first memory means in response to said pattern change data and for altering the color data stored in said second memory means in response to said color change data;

means for repeatedly and sequentially reading the information stored in said first and second memory means and for sequentially combining pattern data with its associated color data to produce combined picture data;

means for converting said combined data generated by said means for reading and combining into a video signal; and television monitor means for converting said video signal into a visual display on said television screen.

40. The system of claim 39 wherein said television screen is divided into a plurality of display areas; and wherein said first and second memory means include memory arrays having individual addresses, each address corresponding to a separate area of said television screen.

41. The system of claim 40 wherein said pattern change data includes at least one pattern data word, each pattern data word containing information indicative of a visual pattern within one of said areas of said television screen.

42. The system of claim 41 wherein said color change data includes at least one color data word, each color data word containing information indicative of the color of the visual pattern and the color of the background within one of said areas of said television screen.

43. The system of claim 42 wherein each pattern data word and each color data word includes check code data positioned at the beginning of each of said words.

44. The system of claim 39 further comprising:

initialization means for generating an initial uniform background color on said television screen by providing initialization data to said first and second memory means prior to receipt of said pattern change data and color change data.

45. The system of claim 39 wherein said tape also includes audio information stored on the same portions of said tape as said picture data information.

46. The system of claim 45 further comprising an audio reproduction system for converting said audio information on said tape into audible sounds.

* * * * *